(12) United States Patent
Schwoebel et al.

(10) Patent No.: US 6,280,880 B1
(45) Date of Patent: Aug. 28, 2001

(54) METHOD FOR SURFACE TREATMENT OF FIBROUS POLYPHENYLENE SULFIDE OR POLYSULFONE

(75) Inventors: Rolf-Peter Schwoebel, Waldmichelbach; Harald Hoffmann, Dossenheim, both of (DE)

(73) Assignee: Carl Freudenberg, Weinheim (DE)

( * ) Notice: Subject to any disclaimer, the term of this patent is extended or adjusted under 35 U.S.C. 154(b) by 0 days.

(21) Appl. No.: 09/611,777

(22) Filed: Jul. 7, 2000

(30) Foreign Application Priority Data

Jul. 7, 1999 (DE) ............................... 199 31 348

(51) Int. Cl.$^7$ .................................... H01M 10/14
(52) U.S. Cl. ..................... 429/251; 429/250; 427/255.4
(58) Field of Search ..................... 429/129, 145, 429/250, 251; 427/322, 324, 255.4, 115, 121

(56) References Cited

U.S. PATENT DOCUMENTS 4,717,623 * 1/1988 Brown et al. ..................... 428/409
5,002,843 * 3/1991 Cieslak et al. ..................... 429/101

FOREIGN PATENT DOCUMENTS

| 2500598 | 7/1975 | (DE) . |
| 6119056 | 12/1986 | (JP) . |
| 546056 | 12/1993 | (JP) . |

* cited by examiner

*Primary Examiner*—Gabrielle Brouillette
*Assistant Examiner*—M. Wills
(74) *Attorney, Agent, or Firm*—Milde, Hoffberg & Macklin, LLP

(57) ABSTRACT

A method for surface treatment of a fibrous polyphenylene sulfide or polysulfone is based on the use of a gas mixture of 1 to 5% in volume of elemental fluorine, of nitrogen as carrier gas and of no more than 20% in volume elemental oxygen. The gas mixture affects the fibers until the total fluorine content in the fiber material is between 0.01 and 0.2 percent in weight. The fibers treated in this manner are particularly suited as separator material in electrochemical energy storage devices with an alkaline electrolyte.

5 Claims, No Drawings

METHOD FOR SURFACE TREATMENT OF FIBROUS POLYPHENYLENE SULFIDE OR POLYSULFONE

BACKGROUND OF THE INVENTION

The invention relates to a method for surface treatment of fibrous polyphenylene sulfide or polysulfone. Combined into area structures, such fibers find applications as separators in electrochemical energy storage devices containing alkali electrolyte.

Electrochemical energy storage devices consist of at least one positive and one negative electrode that are surrounded by a liquid electrolyte. To avoid contact between the positive and negative electrode, and thus, to avoid an undesired current flow inside such an energy storage device, the electrodes are isolated from one another by separators without significantly impairing the passage of the electrolyte's ions.

For use as separators, fiber materials must meet the following requirements:

Resistance to electrolyte and oxidation;

Close weight and thickness tolerances;

Mechanical stability (at least a maximum tensile strength of 70 N/5 cm);

Flexibility for a close fit at the electrodes;

Immediate wettability (less than 10 sec) through the Respective electrolyte; and Temperature resistance up to 80° C.

If the separator fails to meet, or poorly meets, even one of these requirements, significant quality losses or even failure of the electrochemical cell may be the result.

Most often separators of polyamide or polyolefine fibers are employed for the use in storage batteries with an alkaline electrolyte, generally a 30% to 38% aqueous KOH solution.

Generally, untreated, separators of polyphenylene sulfide or polysulfone fibers are poorly wetted by aqueous electrolyte solutions.

From the Patents Abstracts of Japan Vol. 10/No 168 (E-411) Jun. 14th 1986, for Japanese Patent No. JP-A-61-19056, it is known to use area structures of polyolefine, polyvinylalcohol, or polyester that are treated with fluorine-containing nitrogen as separator materials in batteries, especially those with an alkaline electrolyte.

It is also known from the Japanese Patent No. JP-B2-5-46056 to hydrophile synthetic fibers made of polypropylene, polyester or vinylon through a reactive gas of fluorine and oxygen or sulfuric acid. Fibers treated in this manner are used as battery separators that are stable above 45° C.

Fibers or filaments made of polyphenylene sulfide or polysulfone are naturally hydrophobic. With greater wettability through aqueous electrolytes, they would, therefore, be particularly well suited as separator material in electrochemical energy storage devices, because their chemical and thermal resistance makes them resilient to the conditions that occur on the inside of an accumulator.

SUMMARY OF THE INVENTION

It is the principal objective of the present invention to find a way for making polyphenylene sulfide and polysulfone fibers hydrophilic and wettable for alkaline electrolytes such that, immediately after hydrophilization, they exhibit a wetting time of no more than 10 sec against a 30% to 38% aqueous KOH solution. Even after 700 charge and discharge cycles, non-woven separators made of the respective fibers should have a sufficient barrier effect in the battery for it to function properly.

In the following, the term "fibers" relates to both short and long fibers as well as continuous filaments. The terms "non-woven" and "fiber area structures" include high-porosity foils.

A method for surface treatment of a fibrous polyphenylene sulfide or polysulfone was found as a solution to this task, where a gas mixture of 1 to 5% in volume of elemental fluorine, of nitrogen as carrier gas and of no more than 20% in volume elemental oxygen is used, and where this gas mixture is allowed to affect the fibers until the total fluorine content in the fiber material is between 0.01 and 0.2 percent in weight.

Fiber area structures consisting of fibers treated in this manner may be used as separators in batteries with an alkaline electrolyte.

Fluorination can be carried out according to the German Patent No. DE 25 00 598 B2, the disclosure which is incorporated herein by reference. Slight variations of the method are demonstrated in the examples.

Surprising and unforeseeable was that not only the hydrophilic property of the fiber material increased to a multiple of the initial value but that, in addition, a significant increase occurred in the service life and of the cycle strength of the energy storage device.

The drastic degree of increase in service life and cycle strength as well as in the absorption capability for the electrolyte material when using fluorinated polyphenylene sulfide and polysulfone separators according to the invention is demonstrated in the subsequent examples. There, the pretreatment with elemental fluorine is described extensively as well. Fiber and spunbonded materials or fabrics can be used for this purpose.

To accomplish the invention, the nonwovens or fabrics do not need to be altered with regard to their dimensions or porosity that they normally exhibit as separators.

Not only can the pure individual materials be used, but also filament or fiber mixtures of polyphenylene sulfide and polysulfone. These designs are preferred when the area structures are to be exclusively bound thermally; particularly in order to avoid the use of binding agents.

With each of the above-mentioned embodiments of the invention, the necessary requirements for the thermal and mechanical resistance, the flexibility, the wettability and the capillary activity can be fulfilled easily. Fiber area structures, fabrics or spunbonded materials exhibit an absorption capacity of >150 g KOH per m2. The pore volume is above 70%. All area structures resistant are up to 80° C.

DESCRIPTION OF THE PREFERRED EMBODIMENTS

EXAMPLE 1

A fiber non-woven with a weight of 80 g/cm2 is made on a card from polysulfone fibers with a titer of 2 dtex and a cut length of 38 mm. This nonwoven has then been spot-welded with the square welding spots exhibiting an edge length of 0.48 mm and with 48 welding spots to one square-centimeter of the separator surface. The welded area had a portion of 11% relative to the total area of the separator. Through subsequent washing in desalted water at 50° C., the fiber finish was removed. After drying, this area structure has been exposed to a gas mixture of 5 percent in volume of F2 in N2 for one minute in a closed reaction chamber made of V4A steel. The oxygen content in the nitrogen was approximately 5 percent in volume. The analytically determined fluorine content in the fiber material after treatment was 0.07 percent in weight relative to the total weight of the nonwoven. When placing a disk of this nonwoven with a diameter of 2 cm onto the surface of a, relative to the volume, 30% aqueous KOH solution, a wetting time, that is, complete wetting of the sample, of 3.3 sec was observed, while a second sample that has not been exposed to fluorine treatment exhibited a wetting time of more than 100 sec.

The permanent wettability—that is, after several days of continuous storage in the liquid electrolyte—of the separator material treated in this manner was improved as well when compared to the material not treated with fluorine. This result was obtained by storing both nonwoven treated with F2 and untreated nonwoven for 200 hours in 30% aqueous KOH solution at a temperature of 70° C., then washing the materials in desalted water and drying. The wetting times measured thereafter in a 30% KOH solution were 5.0 sec for the F2-treated material and more than 100 sec for the untreated second sample.

This means that almost no wettability was lost through the effect of the electrolyte.

Surprising was the observation that Ni/Cd batteries that were equipped with the fluorine-treated nonwoven as separator material operated impeccably for more than 500 cycles; comparative cells with the non-fluorinated separator material reached at an average only a service life of 350 cycles; they failed due to a lack of capacity.

EXAMPLE 2

On a card, 33.3 percent in weight undrawn and 66.6 percent in weight drawn polyphenylen sulfide fibers, each with a titer of 3.3 dtex and a cut length of 64 mm, were combined to a fiber nonwoven with an area weight of 85g/m2. This nonwoven has then been spot-welded with the square welding spots exhibiting an edge length of 0.30 mm and with 64 welding spots to one square-centimeter of the separator surface. The welded area had a portion of 6% relative to the total area of the separator. Through subsequent washing in desalted water at 50° C., the fiber finish was removed. After drying, this area structure has been exposed to a treatment with elemental fluorine as described in example 1. The analytically determined fluorine content in the fiber material after treatment was 0.06 percent in weight relative to the total weight of the nonwoven.

When testing wettability, a wetting time of 3.3 sec was obtained versus 250 sec for an untreated sample.

After storage in a 30% aqueous KOH solution as previously described for example 1, the wetting time for the sample treated with elemental fluorine was 6.2 sec and the one for the untreated second sample more than 200 sec.

Ni/Cd batteries equipped with both separators withstood more than 1,000 cycles when the separators were treated with elemental fluorine, while only an average of 350 cycles were obtained with non-treated comparative material.

EXAMPLE 3

A spunbonded material with a weight of 60 g/m2 whose continuous fibers consisted of polysulfone and that had a diameter of 8 μm was exposed to a treatment with a gas mixture of elemental fluorine and nitrogen as described for example 1.

After the treatment, the analytically determined fluorine content was 0.08 percent in weight relative to the total weight of the sample.

The wettability test resulted in a wetting time of 5.5 sec, and for the sample not treated with fluorine of more than 300 sec. Opposite sulfuric acid, wetting times of 8.2 sec, and for the untreated sample of more than 300 sec were observed. After storage in a 30% aqueous KOH solution as described for example 1, the wetting time for the treated nonwoven was less than 8 sec and the one for the untreated nonwoven more than 300 sec.

Ni/Cd batteries equipped with these materials as separators withstood more than 2,000 cycles when the separators were fluorinated while the cells equipped with non-fluorinated separators broke down after about 200 cycles.

In all tests that were performed, weight, resistance to electrolyte and oxidation, mechanical stability, flexibility and temperature resistance remained uninfluenced by the treatment with elemental fluorine.

There has thus been shown and described a novel method for surface treatment of fibrous polyphenylene sulfide or polysulfone which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. A method of surface treatment of polyphenylene sulfide or polysulfone fibers to improve their wettability by a 30–38% by weight aqueous KOH solution, said method comprising treating the fibers with a gas mixture comprising elemental fluorine, oxygen and nitrogen as carrier gas, the proportion of elemental fluorine being from 1 to 5% by volume and the proportion of elemental oxygen being not more than 20% by volume, the gas mixture being allowed to act on the fibers until the total fluorine content-of the fibers is in the range from 0.01 to 0.2% by weight, whereby the treated fibers are wettable by said aqueous KOH solution in less than 10 seconds.

2. The method according to claim 1 wherein prior to the treatment with the gas mixture the fibers are formed into a structure comprising at least one of a fiber a spunbonded nonwoven material and a fabric.

3. The method according to claim 2, wherein the structure compises polyphenylene sulphide fibers and polysulphone fibers.

4. A fibrous polyphenylene sulphide or polysulphone structure having a fluorine content of 0.01 to 0.2% by weight obtained by a method according to claim 1, and having a surface wettable by 30–38% by weight aqueous KOH solution in not more than 10s, whereby it is suitable for use as a separator in electrochemical energy storage means with an alkaline electrolyte.

5. An electrochemical energy storage device comprising positive and negative electrodes and an alkaline electrolyte, the electrodes being insulated from one another by a separator of treated fibrous polyphenylene sulphide or polysulphone structure produced by a method according to claim 1.

* * * * *